US012643468B2

(12) United States Patent
Woo et al.

(10) Patent No.: US 12,643,468 B2
(45) Date of Patent: Jun. 2, 2026

(54) VEHICLE ASSISTANCE DEVICE AND METHOD AND VEHICLE HAVING SAME

(71) Applicants: HYUNDAI MOTOR COMPANY, Seoul (KR); KIA CORPORATION, Seoul (KR)

(72) Inventors: Dong Hyeon Woo, Daegu (KR); Hyeon Taek Choi, Bucheon-si (KR); Dong Hoon Lee, Suwon-si (KR); Jeong Eun Kim, Seongnam-si (KR); Jin Kyeom Cho, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 135 days.

(21) Appl. No.: 18/653,136

(22) Filed: May 2, 2024

(65) Prior Publication Data

US 2025/0153637 A1 May 15, 2025

(30) Foreign Application Priority Data

Nov. 13, 2023 (KR) ........................ 10-2023-0156514

(51) Int. Cl.
B60Q 9/00 (2006.01)
G06V 20/59 (2022.01)

(52) U.S. Cl.
CPC ............. B60Q 9/00 (2013.01); G06V 20/597 (2022.01)

(58) Field of Classification Search
CPC ................................. B60Q 9/00; G06V 20/597
See application file for complete search history.

(56) References Cited

U.S. PATENT DOCUMENTS

| | | | |
|---|---|---|---|
| 10,059,347 B2 | 8/2018 | Thieberger-Navon et al. | |
| 12,148,318 B1 * | 11/2024 | Lambert | G06V 20/597 |
| 2015/0193885 A1 * | 7/2015 | Akiva | G07C 5/0841 705/4 |
| 2019/0065873 A1 * | 2/2019 | Wang | G06V 40/168 |
| 2020/0334477 A1 * | 10/2020 | Aoi | A61B 5/11 |
| 2022/0180648 A1 * | 6/2022 | Zhang | B60W 50/16 |
| 2022/0346580 A1 * | 11/2022 | Chen | G01F 23/20 |

FOREIGN PATENT DOCUMENTS

| | | |
|---|---|---|
| CN | 109937152 A | 6/2019 |
| CN | 109937152 B | 3/2022 |
| JP | 2009-085614 A | 4/2009 |
| KR | 2018-0052293 A | 5/2018 |
| KR | 2020-0063193 A | 6/2020 |
| KR | 2023-0037424 A | 3/2023 |

* cited by examiner

*Primary Examiner* — Omer S Khan
(74) *Attorney, Agent, or Firm* — MCDONNELL BOEHNEN HULBERT & BERGHOFF LLP

(57) ABSTRACT

A vehicle assistance device includes an information provider configured to provide information necessary to perform an assistance function, and a controller configured to determine whether a driver is drinking based on information provided from the information provider, to determine a drinking caution level upon determining that the driver is drinking, and to perform drinking assistance control if the drinking caution level meets conditions for entering a drinking caution mode.

18 Claims, 8 Drawing Sheets

Figure 10:
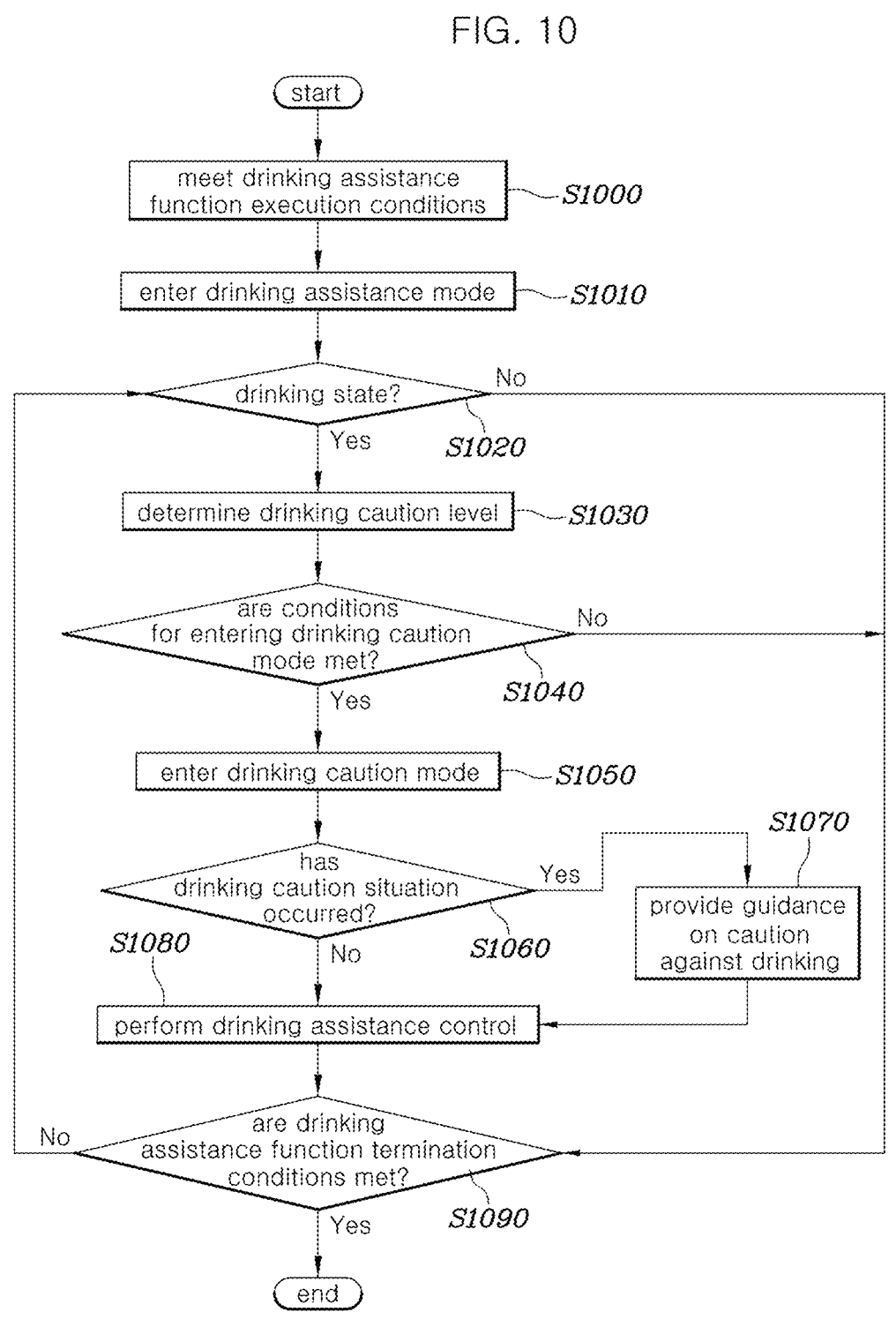

FIG. 10 start meet drinking assistance
function execution conditions — *S1000* enter drinking assistance mode — *S1010* drinking state? — No
Yes     *S1020* determine drinking caution level — *S1030* are conditions
for entering drinking caution
mode met? — No
Yes     *S1040* enter drinking caution mode — *S1050*

*S1070* has
drinking caution situation
occurred? — Yes provide guidance
on caution
against drinking

*S1080*     No     *S1060* perform drinking assistance control are drinking
assistance function termination
conditions met? — No
Yes     *S1090* end

VEHICLE ASSISTANCE DEVICE AND METHOD AND VEHICLE HAVING SAME

CROSS REFERENCE TO RELATED APPLICATIONS

This application claims priority from Korean Patent Application No. 10-2023-0156514, filed on Nov. 13, 2023, in the Korean Intellectual Property Office, the disclosure of which is incorporated herein by reference in its entirety.

BACKGROUND

1. Field

The present disclosure relates to vehicle assistance technology, and more specifically, to a vehicle assistance device and method for recognizing a drinking state of a driver and assisting driving of the driver, and a vehicle having the same.

2. Description of the Related Art

Vehicles are now evolving beyond simple means of transportation into a completely new mobility concept, such as autonomous vehicles, by incorporating rapidly advancing IT technology.

Recently, research on smart vehicles has been actively conducted for the safety and convenience of drivers, pedestrians, and the like, and research on sensors mounted in smart vehicles is being actively conducted in relation to research on smart vehicles.

Due to the development of various sensors and electronic equipment, vehicles equipped with driving assistance functions for assisting drivers in driving and improving driving safety and convenience are attracting attention.

Meanwhile, if a driver drinks a beverage (coffee, water, etc.) while driving, an accident may occur due to negligence in looking ahead of the vehicle. Additionally, if an event such as sudden stop or passing over a bump occurs while a driver is drinking a beverage, the beverage may contaminate the driver's clothes or the interior of the vehicle and the driver may also be burned by a hot beverage.

Therefore, there is a need for a method for assisting a driver in stable drinking while the driver is drinking.

This background technology is technical information that the inventor possessed for deriving the present disclosure or acquired in the process of deriving the present disclosure, and cannot necessarily be said to be known technology disclosed to the general public before filing the application for the present disclosure.

SUMMARY

Therefore, the present disclosure has been made in view of the above problems, and it is an object of an embodiment disclosed in the present disclosure to provide a vehicle assistance device and method implemented to assist a driver in driving by recognizing a drinking state of the driver.

It is another object of the embodiment to provide a vehicle assistance device and method implemented to assist a driver in driving by recognizing a drinking state of the driver and a driving environment.

If is a further object of the embodiment to provide a vehicle assistance device and method implemented to determine a drinking caution level based on a drinking method, a beverage temperature, and a beverage remaining amount, and when the drinking caution level meets preset conditions, enter a drinking caution mode to assist the driver in driving.

It is a further object of the embodiment to provide a vehicle assistance device and method implemented to guide a driver to be careful about drinking in a case where there is a place (e.g., a child protection zone, a curved driving section, or the like) or a facility (a traffic light, a bump, or the like) that requires caution on a driving route.

It is a further object of the embodiment to provide a vehicle assistance device and method implemented to control a motor and a chassis according to a drinking caution level and a driving environment in a case where there is a place or a facility that requires caution on a driving route.

It is a further object of the embodiment to provide a vehicle including the above-described vehicle assistance device.

The technical objects of the present disclosure are not limited to the matters mentioned above, and anyone skilled in the art to which the present disclosure pertains will be able to clearly understand other objects intended by the present disclosure from the following description.

To achieve the objects of the present disclosure, a vehicle assistance device implemented to recognize a drinking state of a driver and assist the driver in driving, a vehicle assistance method thereof, and a vehicle including the same may be provided.

A vehicle assistance device according to an embodiment of the present disclosure may include an information provider configured to provide information necessary to perform an assistance function, and a controller configured to determine whether a driver is drinking based on information provided from the information provider, to determine a drinking caution level upon determining that the driver is drinking, and to perform drinking assistance control if the drinking caution level meets conditions for entering a drinking caution mode.

According to an embodiment, the information provider may include a cup holder sensor disposed in a cup holder in a vehicle and configured to measure a weight of the cup holder, a driver capturing sensor configured to capture an image of a driver's face, and a driving environment information provider configured to provide environmental information on a driving route of the vehicle.

According to an embodiment, the driver capturing sensor may include a camera configured to acquire a general image of the driver's face, and an infrared sensor configured to acquire a thermal image of the driver's face.

According to an embodiment, the driving environment information provider may include a road environment information provider configured to provide road environment information on a driving route of the vehicle, and a front detection sensor configured to detect the front of the vehicle and provide front object information.

According to an embodiment, the controller may determine whether the driver is drinking if the weight of the cup holder provided from the cup holder sensor of the information provider is equal to or greater than a preset reference weight.

According to an embodiment, the controller may recognize a driver's gaze in a driver's face image provided from the driver capturing sensor of the information provider and determine whether the driver is drinking based on the driver's gaze.

According to an embodiment, the controller may determine a drinking method, a beverage temperature, and a beverage remaining amount from the driver's face image provided from the driver capturing sensor of the information provider, and determine the drinking caution level based on at least one of the drinking method, the beverage temperature, or the beverage remaining amount.

According to an embodiment, the controller may determine whether a drinking caution situation has occurred based on driving environment information provided from the driving environment information provider of the information provider upon entering the drinking caution mode.

According to an embodiment, the controller may provide guidance on caution against drinking and then perform the drinking assistance control upon determining that the drinking caution situation has occurred.

A vehicle assistance method according to an embodiment of the present disclosure may include determining whether a driver is drinking based on information provided from an information provider, determining a drinking caution level upon determining that the driver is drinking, determining whether the drinking caution level meets conditions for entering a drinking caution mode, and performing drinking assistance control if the drinking caution level meets the conditions for entering the drinking caution mode.

According to an embodiment, the determining of whether the driver is drinking may be performed if a weight of a cup holder provided from the information provider is equal to or greater than a preset reference weight.

According to an embodiment, the determining of whether the driver is drinking may include recognizing a driver's gaze in a driver's face image provided from the information provider and determining whether the driver is drinking based on the driver's gaze.

According to an embodiment, the determining of the drinking caution level may include determining a drinking method, a beverage temperature, and a beverage remaining amount from the driver's face image provided from the information provider, and determining the drinking caution level based on at least one of the drinking method, the beverage temperature, or the beverage remaining amount.

According to an embodiment, in the determining of the drinking caution level, the drinking method may be determined based on whether a straw is used, the beverage temperature may be determined based on a temperature around a driver's mouth, and the beverage remaining amount may be determined based on a change in the driver's gaze.

According to an embodiment, the determining of whether the drinking caution level meets the conditions for entering the drinking caution mode may include determining that the conditions for entering the drinking caution mode are met if the drinking caution level is equal to or greater than a preset reference level.

According to an embodiment, the vehicle assistance method may further include determining whether a drinking caution situation has occurred based on driving environment information provided from the information provider if the drinking caution level meets the conditions for entering the drinking caution mode, and providing guidance on caution against drinking when the drinking caution situation has occurred.

According to an embodiment, the determining of whether the drinking caution situation has occurred may include determining that the drinking caution situation has occurred if driving route environment information provided from the information provider includes a drinking caution place or facility.

According to an embodiment, wherein the determining of whether the drinking caution situation has occurred may include determining a possibility of collision with a front object based on front object information provided from the information provider, and determining that the drinking caution situation has occurred upon determining that there is a possibility of collision.

According to an embodiment, the vehicle assistance method may further include determining whether drinking assistance function termination conditions are met while performing drinking assistance control.

According to an embodiment, the determining of whether the drinking assistance function termination conditions are met may include determining whether the drinking assistance function termination conditions are met based on the driver's face image provided from the information provider and weight information of the cup holder.

A vehicle according to an embodiment of the present disclosure includes a vehicle assistance device, and the vehicle assistance device may include an information provider configured to provide information necessary to perform an assistance function, and a controller configured to determine whether a driver is drinking based on information provided from the information provider, to determine a drinking caution level upon determining that the driver is drinking, and to perform drinking assistance control if the drinking caution level meets conditions for entering a drinking caution mode.

Specific details according to various examples of the present disclosure other than the means for solving the above-mentioned problems are included in the description and drawings below.

BRIEF DESCRIPTION OF THE FIGURES

The above and other objects, features and other advantages of the present disclosure will be more clearly understood from the following detailed description taken in conjunction with the accompanying drawings, in which:

FIG. 10 is a flowchart illustrating a vehicle assistance method according to an embodiment of the present disclosure.

DETAILED DESCRIPTION

Figure 1:
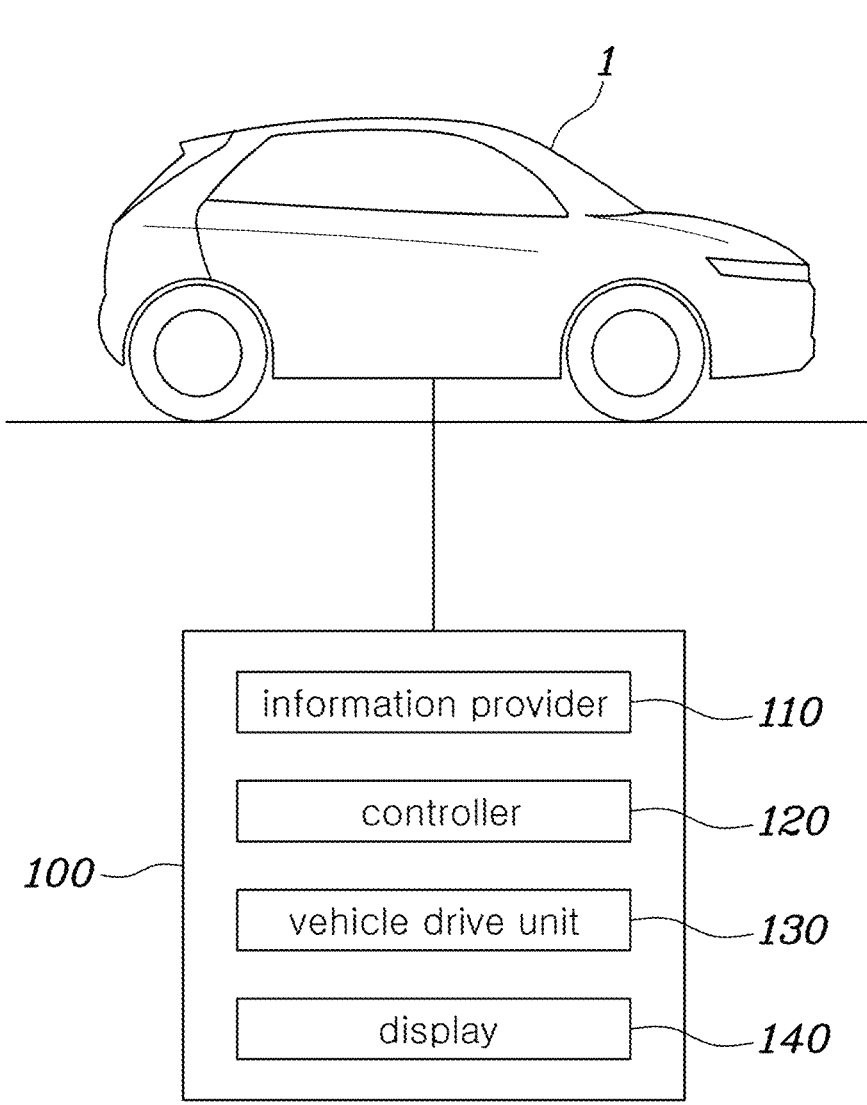
FIG. 1 is a diagram showing a vehicle 1 including a vehicle assistance device 100 according to an embodiment of the present disclosure.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be through and complete and will fully convey the scope to those skilled in the art. Thus, the scope of the present disclosure should be defined by the claims.

In the drawings for explaining the exemplary embodiments of the present disclosure, the illustrated shape, size, ratio, angle, and number are given by way of example, and thus, are not limited to the disclosure of the present disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear. The terms "comprise", "include" and "have" used in this specification do not preclude the presence or addition of other elements unless it is used along with the term "only". The singular forms are intended to include the plural forms as well, unless the context clearly indicates otherwise.

In the interpretation of constituent elements, the constituent elements are interpreted as including an error range even if there is no explicit description thereof.

In the description of temporal relationships, when a temporal relationship between two actions is described using "after", "subsequently", "next", "before", or the like, the actions may not occur in succession unless the term "directly" or "just" is used.

Although terms such as "first" and "second" may be used to describe various elements, these terms are merely used to distinguish the same or similar elements from each other. Therefore, a first element mentioned below may be a second element within the technical scope of the present disclosure.

It will be understood that, although the terms "first", "second", A, B, (a), (b), etc. may be used herein to describe elements of the present disclosure, these terms are only used to distinguish one element from another element and necessity, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

"At least one" should be understood to include any combination of one or more of associated elements. For example, "at least one of first, second, and third elements" means not only the first, second, or third element, but also combinations of two or more of the first, second, and third elements.

The respective features of the present disclosure may be partially or wholly coupled to and combined with each other, and various technical linkage and driving thereof are possible. These various embodiments may be performed independently of each other, or may be performed in association with each other.

Hereinafter, the present disclosure will be described through the attached drawings and embodiments. The scale of elements shown in the drawings is different from the actual scale for convenience of description and is therefore not limited to the scale shown in the drawings.

Hereinafter, a vehicle assistance device and method, and a vehicle having the same according to an embodiment of the present disclosure will be described with reference to the attached drawings.

Figure 2:
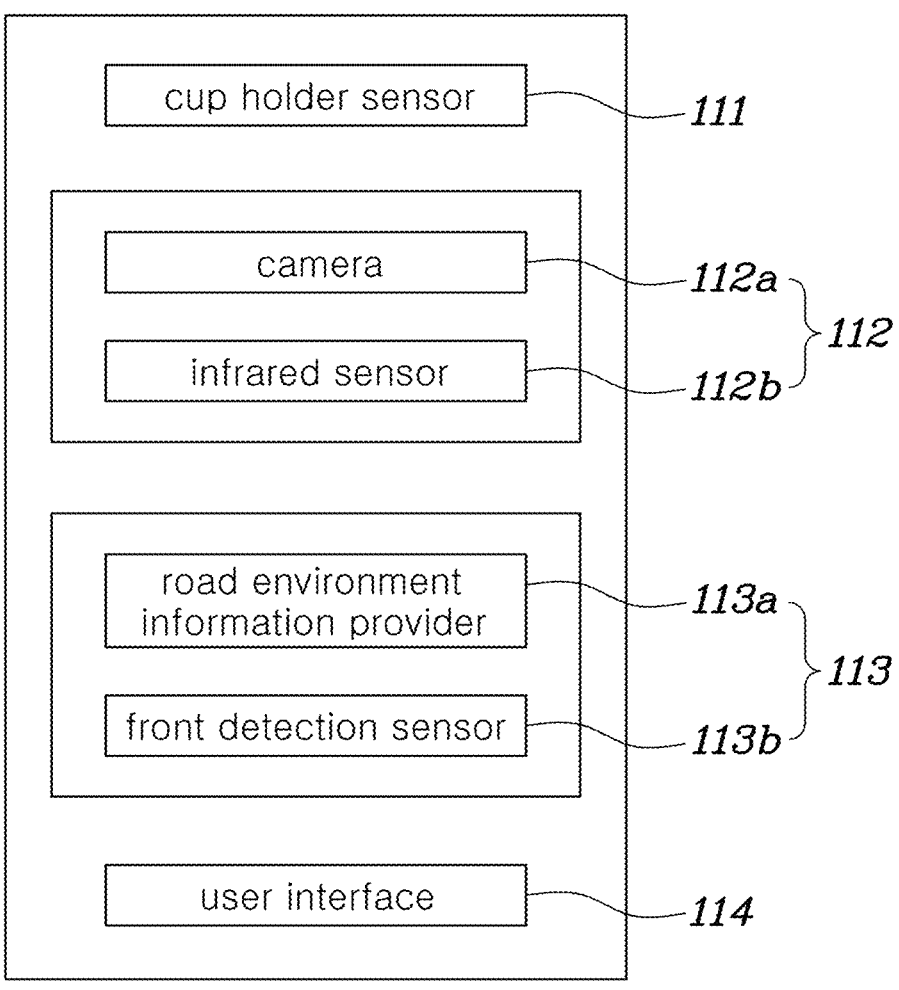
FIG. 2 is a diagram showing a detailed configuration of an information provider 110 according to an embodiment of the present disclosure.

FIG. 1 is a diagram showing a vehicle 1 including a vehicle assistance device 100 according to an embodiment of the present disclosure and FIG. 2 is a diagram showing a detailed configuration of an information provider 110 according to an embodiment of the present disclosure.

Referring to FIGS. 1 and 2, the vehicle 1 may include the vehicle assistance device 100 according to an embodiment of the present disclosure.

The vehicle 1 may be a vehicle equipped with a motor as a power source. For example, vehicle 1 may be an electric vehicle (EV), a hybrid electric vehicle (HEV), a plug-in hybrid electric vehicle (PHEV), a fuel cell electric vehicle (FCEV), or the like.

The vehicle assistance device 100 according to the embodiment may be mounted on the vehicle 1 to assist a driver. In an embodiment, the vehicle assistance device 100 may assist the driver in drinking and execute an appropriate drinking assistance function according to a drinking caution level determined according to a drinking state of the driver and a driving environment.

The vehicle assistance device 100 may determine a drinking caution level based on a drinking method, a beverage temperature, and a beverage remaining amount, determine whether to activate the drinking assistance function (or whether to enter a drinking caution mode) based on the drinking caution level, and execute the drinking assistance function based on the drinking caution level and a driving environment in a state in which the drinking assistance function is activated (or in the drinking caution mode).

The vehicle assistance device 100 can provide guidance on (or warn) caution against drinking and control a drive unit 130 of the vehicle 1 depending on a drinking caution level and a driving environment. In an embodiment, the vehicle assistance device 100 may perform motor control, chassis control (e.g., suspension control), and the like.

According to the embodiment, the vehicle assistance device 100 may include an information provider 110, a controller 120, a drive unit 130, and a display 140, but the configuration of the vehicle assistance device 100 is not limited thereto.

The information provider 110 according to the embodiment may obtain information necessary to determine whether to execute the drinking assistance function, information necessary at the time of executing the drinking assistance function, and the like, and provide the obtained information to the controller 120.

According to the embodiment, the information provider 110 may include a cup holder sensor 111, a driver capturing sensor 112, and a driving environment information provider 113, but the configuration of the information provider 110 is not limited thereto.

The cup holder sensor 111 may be placed in a cup holder in the vehicle and can measure the weight of the cup holder.

The cup holder sensor 111 may provide the measured weight to the controller 120, and the weight measured by the cup holder sensor 111 (hereinafter referred to as a measured weight) may be used by the controller 120 to determine whether a beverage has been brought into the vehicle 1. That is, the controller 120 can determine whether a beverage has been brought into the vehicle 1 based on the measured weight provided from the cup holder sensor 111.

For example, the controller 120 can compare the measured weight provided from the cup holder sensor 111 with a preset reference weight, and if the measured weight is equal to or greater than the reference weight, determine that a beverage has been brought into the vehicle 1.

Determination of whether a beverage has been brought into the vehicle can be used for the controller 120 to determine whether drinking assistance function execution conditions are satisfied.

That is, upon determining that a beverage has been brought into the vehicle, the controller can determine that the drinking assistance function execution conditions are satisfied and execute the drinking assistance function.

Meanwhile, there are cases in which the driver receives a beverage from another passenger and drinks it or the driver drinks a beverage in a situation in which the beverage is not placed in the cup holder, such as a case in which the driver brings a beverage into the vehicle and then does not place the beverage in the cup holder.

In order to prepare for such a case, the information provider 110 may further include a user interface 114 that receives information on whether or not the drinking assistance function is executed and provides the information to the controller 120.

The user interface 114 can provide a drinking assistance function execution on signal to the controller 120 according to an external (e.g., driver) operation, and the controller 120 can determine that the drinking assistance function execution conditions are met and execute the drinking assistance function upon reception of the drinking assistance function execution on signal.

Further, the weight measured by the cup holder sensor 111 or a signal from the user interface 114 may be used for the controller 120 to determine whether to end the drinking assistance function.

According to the embodiment, if the weight measured by the cup holder sensor 111 is less than the preset reference weight, the controller 120 may determine that drinking assistance function termination conditions are satisfied and end the drinking assistance function.

According to the embodiment, when the controller 120 receives a drinking assistance function execution off signal from the user interface 114, the controller 120 may determine that the drinking assistance function termination conditions are met and end the drinking assistance function.

The driver capturing sensor 112 according to the embodiment is provided in the vehicle 1 and can capture an image of the driver's face.

The driver capturing sensor 112 may be installed in the vehicle 1 to facilitate capturing an image of the driver's face. For example, the driving capturing sensor 112 may be installed in front of the driver, but the installation location of the driver capturing sensor 112 is not limited thereto.

The driver capturing sensor 112 can obtain a general image and a thermal image of the driver's face. The general image/thermal image obtained by the driver capturing sensor 112 can be used for the controller 120 to determine a drinking caution level.

The driver capturing sensor 112 may include a camera 112a for acquiring a general image of the driver's face, and an infrared sensor 112b for acquiring a thermal image of the driver's face.

The driving environment information provider 113 according to the embodiment may provide environmental information ("driving environment information") on a driving route of the vehicle 1. For example, the driving environment information provider 11 may provide road environment information and front object information on a driving route of the vehicle 1.

The driving environment information provider 113 may include a road environment information provider (e.g., a navigation system) 113a for providing road environment information on a driving route of the vehicle 1, and a front detection sensor 113b for detecting the front of the vehicle 1.

The road environment information provider 113a can recognize drinking caution places (e.g., child protection zones, curved driving sections, etc.) or facilities (e.g., traffic lights, bumps, etc.) that exist on driving routes and provides recognition results and distance information to the controller 120.

The front detection sensor 113b can detect an object in front (including the front, right front, and left front) of the vehicle and determine relative information (e.g., relative distance, relative speed, etc.) with respect to a detected object.

The front detection sensor 113b may provide the relative information with respect to the detected object to the controller 120.

The controller 120 according to the embodiment may perform the drinking assistance function based on information provided from the information provider 110.

For example, the controller 120 may include a hybrid control unit (HCU), a vehicle control unit (VCU), or an electric control unit (ECU).

According to the embodiment, if the weight measured by the cup holder sensor 111 is equal to or greater than the preset reference weight, the controller 120 may determine that the drinking assistance function execution conditions are met and execute the drinking assistance function.

According to the embodiment, when the controller 120 receives the drinking assistance function on signal from the user interface 114, the controller 120 may determine that the drinking assistance function execution conditions are met and execute the drinking assistance function.

The controller 120 may receive images (hereinafter, driver's face images) from the driver capturing sensor 112 to determine a drinking caution level and enter the drinking caution mode if the drinking caution level is equal to or greater than the preset reference level.

According to the embodiment, the controller 120 may determine a drinking method, a beverage temperature, and a beverage remaining amount, and determine a drinking caution level based on the drinking method, beverage temperature, and beverage remaining amount.

The controller 120 may process the driver's face images provided from the driver capturing sensor 112 to determine whether the driver is drinking, and upon determining that the driver is drinking, determine a drinking method, a beverage temperature, and a beverage remaining amount.

The controller 120 may recognize the driver's gaze in the driver's face images provided from the driver capturing sensor 112 and determine whether the driver is drinking based on the recognized driver's gaze.

For example, the controller 120 may determine whether the driver is drinking by determining whether the driver's gaze is directed toward the cup holder or whether the driver's gaze changes as during drinking.

The controller 120 may recognize an object (e.g., a cup, a beverage bottle, or the like) around the mouth in the driver's face images provided from the driver capturing sensor 112 and determine whether the driver is drinking based on the movement of the recognized object.

Figure 3:
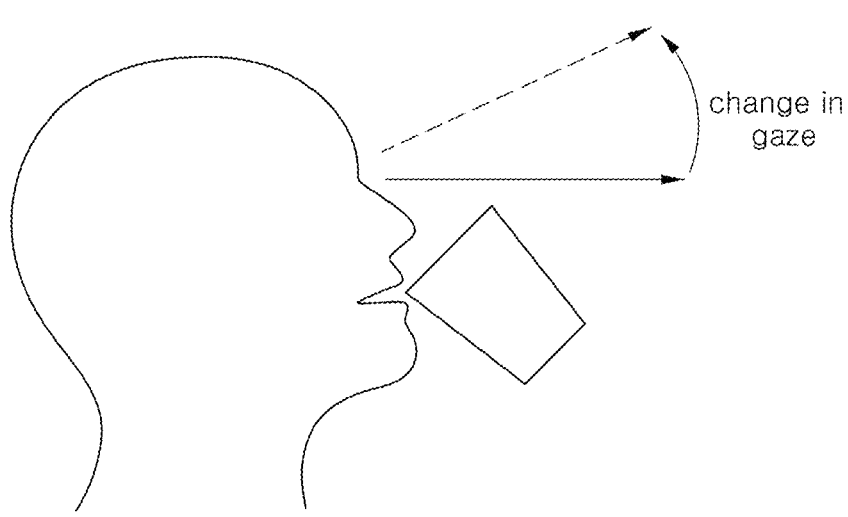
FIG. 3 is a diagram showing an example of an image used for a controller 120 to determine drinking according to an embodiment of the present disclosure.

FIG. 3 is a diagram showing an example of an image used by the controller 120 to determine a drinking state according to an embodiment of the present disclosure.

Referring to FIG. 3, the controller 120 can recognize a driver's gaze and an object in the driver's face image and determine whether the driver is drinking based on the recognition result. However, the method by which the controller 120 determines a drinking state of the driver is not limited thereto.

Upon determining that the driver is drinking, the controller 120 can determine a drinking method, a beverage temperature, and a beverage remaining amount.

The controller 120 may determine whether the driver is using a straw based on the driver's face image.

The controller 120 may determine the beverage remaining amount based on a change in the driver's gaze in the driver's face image. For example, the controller 120 may determine that the beverage remaining amount is large if the change in the driver's gaze is greater than a reference change amount, and determine that the beverage remaining amount is small if the change in the driver's gaze is less than the reference change amount. Of course, the method by which the controller 120 determines the beverage remaining amount is not limited thereto.

According to an embodiment, the controller 120 may recognize the temperature around the mouth based on a thermal image and determine a beverage temperature based on the recognition result.

The controller 120 may determine a beverage temperature based on body temperature and determine the beverage temperature as three levels based on a degree of similarity between the body temperature and the beverage temperature.

For example, the controller 120 may determine a beverage to be "cold" if the beverage temperature is lower than the body temperature by a certain temperature (e.g., a first set temperature), determine the beverage to be "hot" if the beverage temperature is higher than the body temperature by a certain temperature (e.g., a second set temperature), and determine the beverage temperature as "similar" if the difference between the beverage temperature and the body temperature is within the first set temperature and within the second set temperature.

According to the embodiment, the controller 120 may determine a drinking caution level based on a drinking method, a beverage temperature, and a beverage remaining amount.

Table 1 below shows examples in which the controller 120 determines a drinking caution level based on a drinking method, a beverage remaining amount, and a beverage temperature.

The method of determining a drinking caution level is not limited to the examples in Table 1, and drinking caution level determination may be performed based on at least one of a drinking method, a beverage temperature, or a beverage remaining amount.

TABLE 1

| Drinking method | Beverage remaining amount | Beverage temperature (relative to body temperature) | | |
|---|---|---|---|---|
| | | Cold | Similar | Hot |
| Using straw | X | Level 1 (Low) | Level 1 (Low) | Level 3 (High) |
| Not using straw | Small | Level 1 (Low) | Level 2 (Medium) | Level 3 (High) |
| | Large | Level 2 (Medium) | Level 3 (High) | Level 3 (High) |

Although Table 1 shows that the controller 120 determines a drinking caution level as three levels (level 1 to level 3), the present disclosure is not limited thereto and it is possible to determine a drinking caution level as further divided levels according to an embodiment.

According to the embodiment, the controller 120 may enter the drinking caution mode when the determined drinking caution level satisfies conditions for entering the drinking caution mode and perform the drinking assistance function based on the drinking caution level and a driving environment.

Referring to Table 1, for example, the controller 120 can enter the drinking caution mode when the drinking caution level is level 2 or level 3.

According to the embodiment, the controller 120 may determine whether a drinking caution situation has occurred based on driving environment information provided by the driving environment information provider 113.

For example, the controller 120 may determine that a drinking caution situation has occurred in a case where driving route environment information provided by the road environment information provider 113*a* includes a drinking caution place (e.g., a child protection zone, a curved driving section, or the like) or a facility (e.g., a traffic light, a bump, or the like).

For example, the controller 120 may determine a possibility of collision with a front object based on front object information (e.g., relative distance, relative speed, etc.) provided from the front detection sensor 113*b*, and determine that a drinking caution situation has occurred upon determining that there is a possibility of collision.

For example, the controller 120 may determine a time-to-collision (TTC) between the vehicle 1 and the front object based on the front object information and determine that there is a possibility of collision if the determined TTC is equal to or less than a threshold value.

Figure 4:
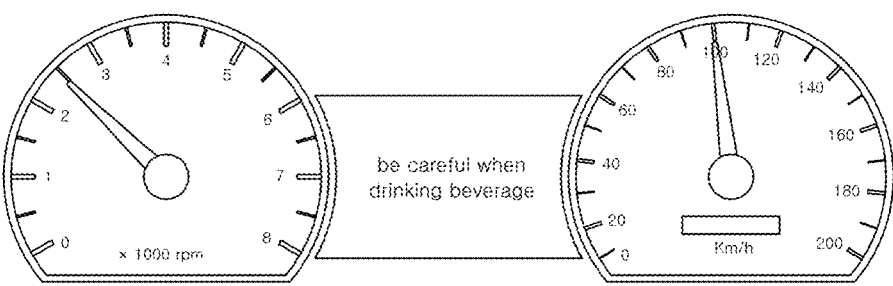
FIG. 4 is a diagram showing an example in which the controller 120 provides guidance on caution against drinking through a display 140 according to an embodiment of the present disclosure.

FIG. 4 is a diagram showing an example in which the controller 120 provides guidance on caution against drinking through the display 140 according to an embodiment of the present disclosure.

Upon determining that a drinking caution situation has occurred, the controller 120 may provide guidance on (or warn) caution against drinking through the display 140 as shown in FIG. 4.

For example, the display 140 may include a cluster, Audio/Video/Navigation (AVN), Head Up Display (HUD), etc.

The controller 120 may determine that a drinking caution situation has not occurred, or after providing guidance on caution against drinking, perform drinking assistance control based on the drinking caution level and driving environment information.

For example, the controller 120 may perform driving assistance control based on the drinking caution level and driving environment information upon determining that a drinking caution situation has not occurred or after providing guidance on caution against drinking.

For example, the controller 120 may perform the drive unit 130 of the vehicle 1 based on the drinking caution level and driving environment information. For example, the controller 120 may perform motor control, chassis control (e.g., suspension control), etc.

Table 2 below shows examples in which the controller 120 performs drinking assistance control depending on a drinking caution level and driving section characteristics.

TABLE 2

| | Motor control | | Chassis control | |
|---|---|---|---|---|
| | Level 2 | Level 3 | Level 2 | Level 3 |
| Straight section | Maintain | Maintain | Maintain | Maintain |
| Curved section | Maintain | Reduce speed | Maintain | Enable Control |
| Bump section | Reduce speed (e.g., 30 kph or less) | Reduce speed (e.g., 10 kph or less) | Enable control | Enable control |

Figure 5A:
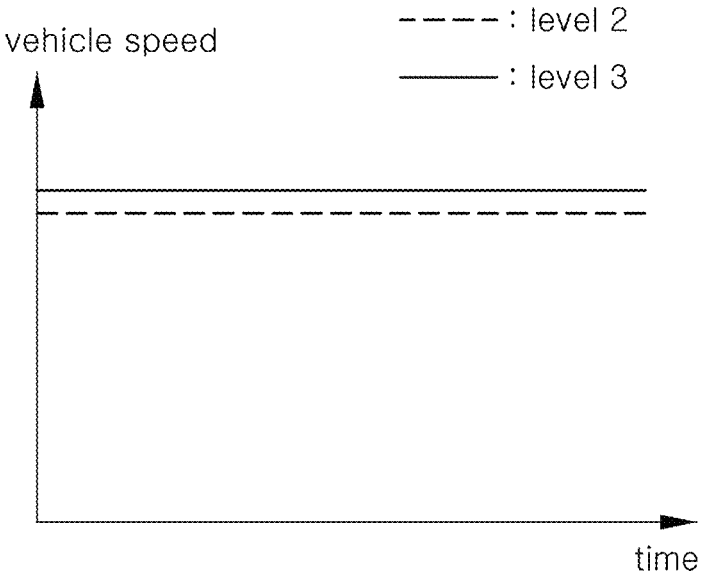
FIGS. 5A and 5B show examples of changes in a vehicle speed (corresponding to a motor speed) and a chassis damping force according to control performed in a straight section in Table 2.
Figure 5B:
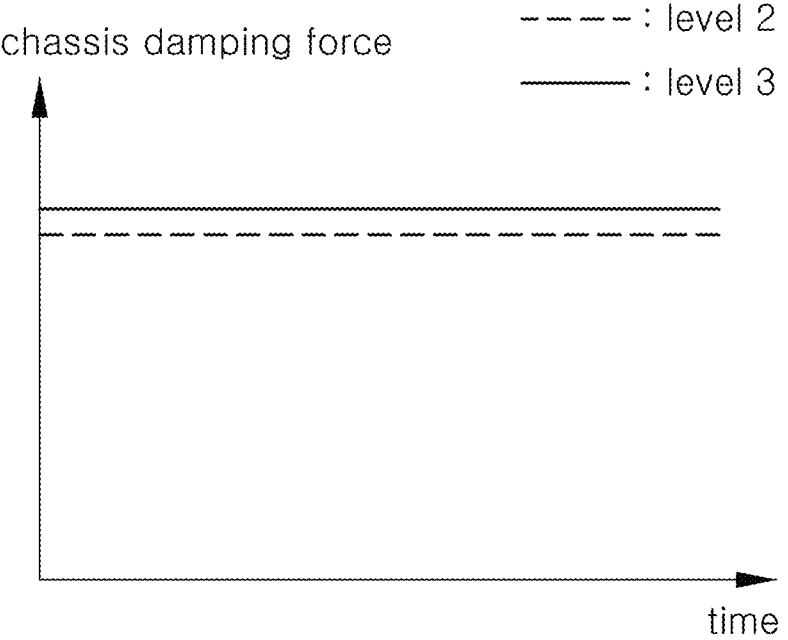

FIGS. 5A and 5B show examples of changes in a vehicle speed (corresponding to a motor speed) and a chassis damping force according to control performed in a straight section in Table 2.

In FIGS. 5A and 5B, the dotted line indicates a case where the drinking caution level is level 2 and the solid line indicates a case where the drinking caution level is level 3.

Referring to Table 2 and FIGS. 5A and 5B, the controller 120 can maintain the vehicle state in a straight section regardless of the drinking caution level. Accordingly, the vehicle speed and chassis damping force can be maintained constant in the straight section.

Figure 6A:
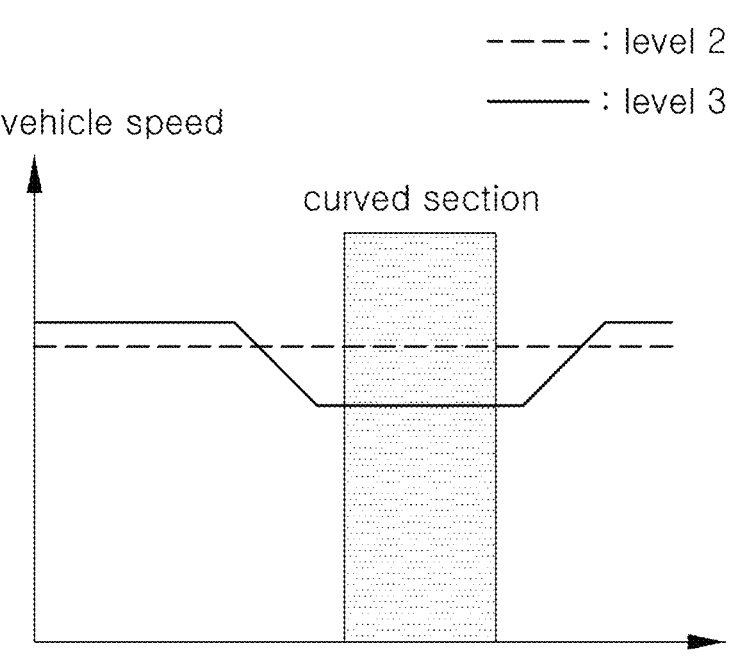
FIGS. 6A and 6B show examples of changes in the vehicle speed (corresponding to the motor speed) and chassis damping force according to control performed in a curved section in Table 2.
Figure 6B:
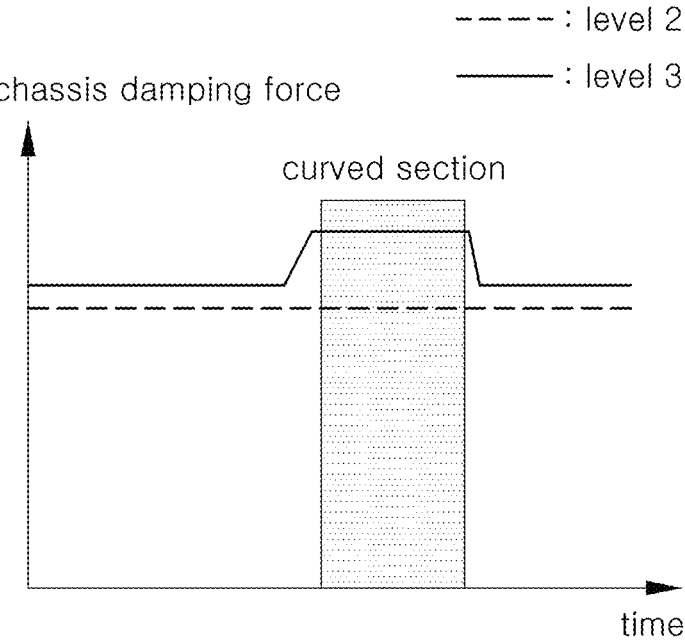

FIGS. 6A and 6B show examples of changes in the vehicle speed (corresponding to the motor speed) and chassis damping force according to control performed in a curved section in Table 2.

In FIGS. 6A and 6B, the dotted line indicates a case where the drinking caution level is level 2 and the solid line indicates a case where the drinking caution level is level 3.

Referring to Table 2 and FIGS. 6A and 6B, in the curved section, the controller 120 maintains the vehicle state when the drinking caution level is level 2 and performs deceleration control for the motor and performs control entry for the chassis when the drinking caution level is level 3.

Accordingly, when the drinking caution level is level 2, the vehicle speed and the chassis damping force can be maintained constant. On the other hand, when the drinking caution level is level 3, the vehicle speed can be reduced and the chassis damping force can be increased in a curved section.

Figure 7A:
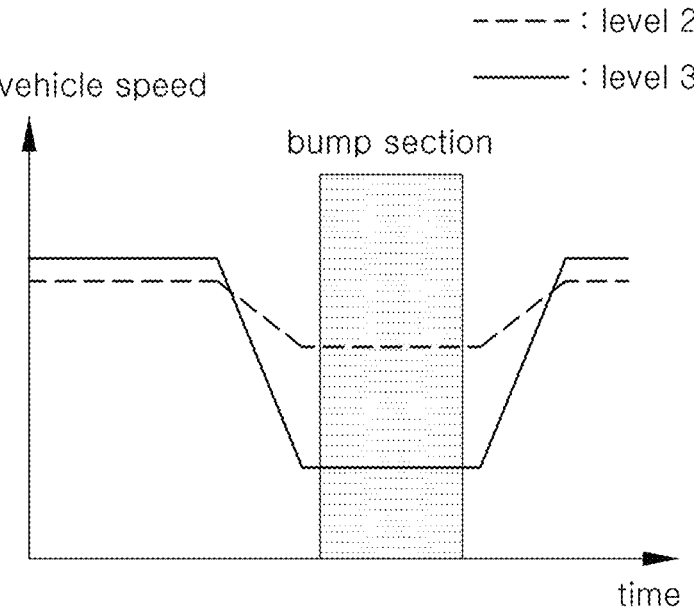
FIGS. 7A and 7B show examples of changes in the vehicle speed (corresponding to the motor speed) and chassis damping force according to control performed in a bump section in Table 2.
Figure 7B:
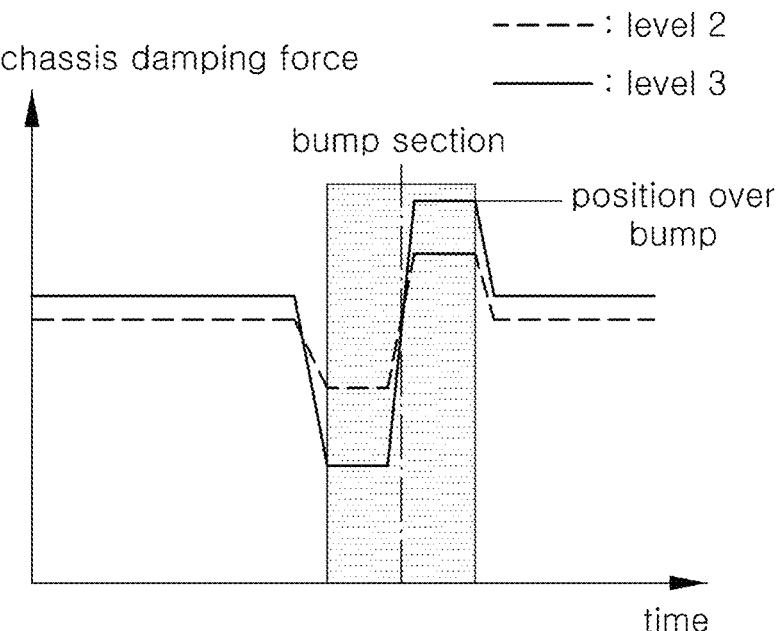

FIGS. 7A and 7B show examples of changes in the vehicle speed (corresponding to the motor speed) and chassis damping force according to control performed in a bump section in Table 2.

In FIGS. 7A and 7B, the dotted line indicates a case where the drinking caution level is level 2 and the solid line indicates a case where the drinking caution level is level 3.

Referring to Table 2 and FIGS. 7A and 7B, when the drinking caution level is level 2 and level 3, the controller 120 can reduce the vehicle speed through deceleration control for the motor and increase the chassis damping force through control entry for the chassis.

With respect to the vehicle speed, the controller 120 can control the amount of deceleration of the motor to be greater when the drinking caution level is level 3 than when the drinking caution level is level 2. Accordingly, the amount of change in deceleration when the drinking caution level is level 3 may be greater than the amount of change in deceleration when the drinking caution level is level 2.

With respect to the chassis damping force, the controller 120 can control the control amount for the chassis to be greater when the drinking caution level is level 3 than when the drinking caution level is level 2. Accordingly, the amount of change in the chassis damping force when the drinking caution level is level 3 may be greater than the amount of change in the chassis damping force when the drinking caution level is level 2.

Figure 8:
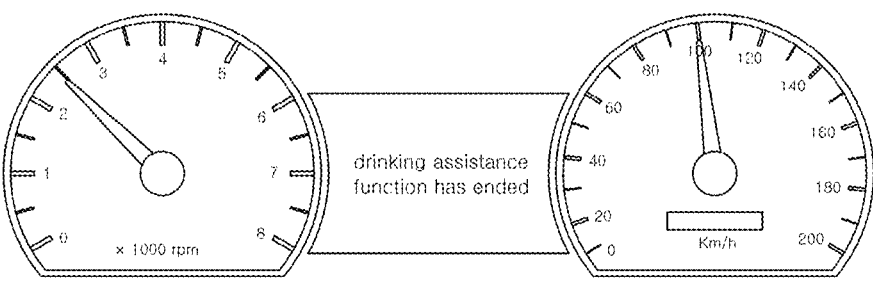
FIG. 8 is a diagram showing an example in which the controller 120 provides guidance on termination (or cancellation) of the drinking assistance function through the display 140 according to an embodiment of the present disclosure.

FIG. 8 is a diagram showing an example in which the controller 120 provides guidance on termination (or cancellation) of the drinking assistance function through the display 140 according to an embodiment of the present disclosure.

According to the embodiment, upon determining that drinking assistance function termination conditions are met, the controller 120 may terminate the drinking assistance function (or drinking assistance control) and, as shown in FIG. 8, provide guidance on termination of the drinking assistance function.

For example, the controller 120 may determine that a driver's gaze is directed forward based on an image provided from the driver capturing sensor 112, and determine that the drinking assistance function termination conditions are met upon determining that a beverage is placed in the cup holder based on weight information provided from the cup holder sensor 111.

For example, the controller 120 may determine that the drinking assistance function termination conditions are met upon reception of the drinking assistance function execution off signal from the user interface 114.

Figure 9:
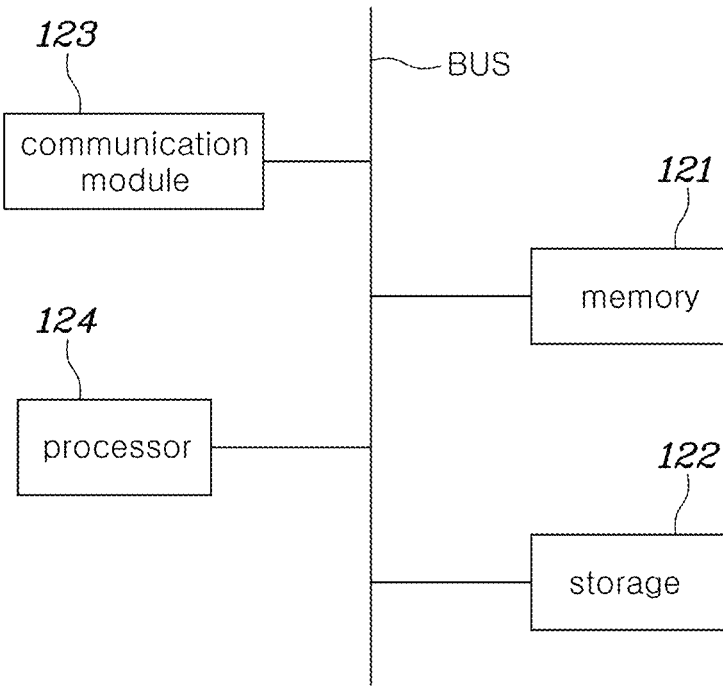
FIG. 9 is a diagram showing a detailed configuration of the controller 120 according to an embodiment of the present disclosure.

FIG. 9 is a diagram showing a detailed configuration of the controller 120 according to an embodiment of the present disclosure.

Referring to FIGS. 1 to 9, the controller 120 may include a memory 121, a storage 122, a communication module 123, and a processor 124, but the configuration of the controller 120 is not limited thereto. The processor 124 may be connected to the memory 121, the storage 122, and the communication module 123 through an internal bus.

The memory 121 may store various algorithms, data, etc. necessary for the processor 124 to operate.

The memory 121 may include a volatile memory and/or a non-volatile memory. Examples of the volatile memory include dynamic random access memory (DRAM), static RAM (SRAM), synchronous DRAM (SDRAM), phase-change RAM (PRAM), magnetic RAM (MRAM), resistive RAM (RRAM), ferroelectric RAM (FeRAM), etc. Examples of the non-volatile memory include read only memory (ROM), programmable ROM (PROM), electrically programmable ROM (EPROM), electrically erasable programmable ROM (EEPROM), flash memory, etc.

The storage 122 may store data acquired during operation of the processor 124. For example, the storage 122 may include a medium such as a hard disk drive (HDD), a solid state drive (SSD), an embedded multimedia card (eMMC), or universal flash storage (UFS).

The storage 122 may store data or information acquired or generated by the processor 124 while performing the drinking assistance function.

The communication module 123 can transmit/receive information to/from an external device through communication and can transmit received information to the processor 124.

The communication module 123 may receive information provided from the information provider 110 and transmit the same to the processor 124, or may provide information received from the processor 124 to the display 140.

The processor 124 may perform operations or data processing related to control of at least one other component of the controller 120. For example, the processor 124 may execute an algorithm stored in the memory 121.

The processor 124 may process received data and data stored in the memory 121. The processor 124 may execute computer-readable code (e.g., an algorithm) stored in the memory 121 and instructions triggered by the processor 124.

The processor 124 may be a data processing device implemented as hardware having a circuit with a physical structure for executing desired operations. For example, the desired operations may include code or instructions included in a program.

For example, data processing devices implemented as hardware include a microprocessor, a central processing unit, a processor core, a multi-core processor, a multiprocessor, an application-specific integrated circuit (ASIC), and a field programmable gate array (FPGA).

Upon determining that the drinking assistance function execution conditions are met based on information received from the user interface 114, the processor 124 may enter the drinking assistance mode and perform the drinking assistance function.

The processor 124 may determine whether the driver is drinking by processing a driver's face image provided from the driver capturing sensor 112.

The processor 124 may determine a drinking method, a beverage temperature, and a beverage remaining amount by processing the driver's face image provided from the driver capturing sensor 112, and determine a drinking caution level based on the drinking method, beverage temperature, and beverage remaining amount.

The processor 124 may perform drinking assistance control based on driving environment information provided from the driving environment information provider 113.

The processor 124 may determine whether a drinking caution situation has occurred based on the driving environment information provided by the driving environment information provider 113.

The processor 124 may control the drive unit 130 of the vehicle 1 based on the drinking caution level and the driving environment information.

The processor 124 may determine whether the drinking assistance function termination conditions are met based on external information, and may terminate the drinking assistance function if the drinking assistance function termination conditions are met.

FIG. 10 is a flowchart illustrating a vehicle assistance method according to an embodiment of the present disclosure.

The step-by-step operations shown in FIG. 10 can be performed by the vehicle assistance device 100 described with reference to FIGS. 1 to 9. Hereinafter, the vehicle assistance method according to an embodiment of the present disclosure will be described focusing on the operation of the controller 120 on the assumption that the drinking assistance function execution conditions are met.

Referring to FIGS. 1 to 10, upon determining that the drinking assistance function execution conditions are met (S1000), the controller 120 may enter the drinking assistance mode (S1010).

In step S1000, the controller 120 may determine that the drinking assistance function execution conditions are met if the weight measured by the cup holder sensor 111 is equal to or greater than a preset reference weight or when the drinking assistance function on signal is received from the user interface 114.

Upon entering the drinking assistance mode, the controller 120 may determine whether the driver is drinking (S1020).

In step S1020, the controller 120 may determine whether the driver is drinking by processing a driver's face image provided from the driver capturing sensor 112.

According to the embodiment, the controller 120 may recognize a driver's gaze in the driver's face image provided from the driver capturing sensor 112 and determine whether the driver is drinking based on the recognized driver's gaze.

If it is determined that the driver is not drinking (No in S1020), the controller 120 may determine whether the drinking assistance function termination conditions are met (S1090).

If it is determined that the driver is drinking (Yes in S1020), the controller 120 may determine a drinking caution level (S1030).

In step S1030, the controller 120 may determine a drinking method, a beverage temperature, and a beverage remaining amount, and determine a drinking caution level based on the drinking method, beverage temperature, and beverage remaining amount.

In step S1030, the controller 120 may determine whether the driver is using a straw by processing the driver's face image provided from the driver capturing sensor 112.

In step S1030, the controller 120 may determine a beverage remaining amount based on the amount of change in the driver's gaze in the driver's face image provided from the driver capturing sensor 112.

In step S1030, the controller 120 may recognize the temperature around the mouth based on the driver's face image provided from the driver capturing sensor 112 and determine the beverage temperature based on the recognition result.

After determining the drinking caution level, the controller 120 may determine whether the drinking caution level satisfies the conditions for entering the drinking caution mode (S1040).

In step S1040, the controller 120 may determine that the conditions for entering the drinking caution mode are met if the drinking caution level is equal to or greater than a preset reference level.

If the conditions for entering the drinking caution mode are not met (No in S1040), the controller 120 may determine whether the drinking assistance function termination conditions are met (S1090).

When the conditions for entering the drinking caution mode are met (Yes in S1040), the controller 120 enters the drinking caution mode (S1050) and may determine whether a drinking caution situation has occurred based on driving environment information provided from the driving environment information provider 113 (S1060).

In step S1060, the controller 120 may determine that a drinking caution situation has occurred if driving route environment information provided by the road environment information provider 113a includes a drinking caution place (e.g., a child protection zone, a curved driving section, or the like) or a facility (e.g., a traffic light, a bump, or the like).

In step S1060, the controller 120 determines the possibility of collision with a front object based on front object information (e.g., relative distance, relative speed, and the like) provided from the front detection sensor 113b, and determines that a drinking caution situation has occurred if there is a possibility of collision.

If it is determined that a drinking caution situation has occurred (Yes in S1060), the controller 120 may notify of caution against drinking through the display 140 (S1070).

After determining that a drinking caution situation has not occurred (No in S1060) or providing guidance on caution against drinking (S1070), the controller 120 may perform drinking assistance control based on the drinking caution level and driving environment information (S1080).

In step S1080, the controller 120 may control the drive unit 130 of the vehicle 1. For example, the controller 120 may perform motor control, chassis control (e.g., suspension control), etc.

Thereafter, the controller 120 may determine whether the drinking assistance function termination conditions are met while performing drinking assistance control (S1090).

In step S1090, the controller 120 may determine that the drinking assistance function termination conditions are met upon determining that the driver's gaze is directed forward based on the image provided from the driver capturing sensor 112 and determining that a beverage is placed in the cup holder based on weight information provided from the cup holder sensor 111.

In step S1090, upon reception of the drinking assistance function execution off signal from the user interface 114, the controller 120 may determine that the drinking assistance function termination conditions are met.

If the drinking assistance function termination conditions are met (Yes in S1090), the controller 120 may terminate the assistance operation.

If the drinking assistance function termination conditions are not met (No in S1090), the controller 120 may continuously perform drinking assistance control (S1080).

According to the embodiment of the present disclosure, vehicle assistance technology by which it is possible to assist a driver by recognizing a drinking state of the driver and a driving environment can be provided.

According to the embodiment, the vehicle assistance device or the vehicle assistance method can assist a driver in drinking based on a drinking method, a beverage temperature, and a beverage remaining amount.

Additionally, the vehicle assistance device or the vehicle assistance method can assist a driver in drinking by controlling a motor and a chassis based on a driving environment.

According to the embodiment, the vehicle assistance device or the vehicle assistance method can provide guidance (or warning) for caution against drinking in a case where there is a place (e.g., a child protection zone, a curved driving section, or the like) or a facility (e.g., a traffic light, a bump, or the like) on a driving route.

In this manner, the vehicle assistance device or the vehicle assistance method can execute an appropriate drinking assistance function depending on a drinking state of a driver and a driving environment. Therefore, the driver of a vehicle equipped with the vehicle assistance technology according to the embodiments of the present disclosure can perform stable drinking.

In addition, since appropriate motor/chassis control is performed depending on a driving environment, it is possible to prevent a beverage from spilling as much as possible in a situation such as sudden stop or passing over a bump.

Therefore, it is possible to prevent the driver's clothes or the interior of the vehicle from being contaminated by the spilled beverage and to prevent the driver from being burned by a hot beverage.

The effects of the present disclosure are not limited to the effects mentioned above, and other effects not mentioned will be clearly understood by those skilled in the art from the description below.

Since the above-mentioned problems to be solved, means of solving the problems, and effects do not specify the essential features of the claims, the scope of the claims is not limited by the matters described in the content of the disclosure.

Although embodiments of the present disclosure have been described in more detail with reference to the accompanying drawings, the present disclosure is not necessarily limited to these embodiments, and various modifications may be made without departing from the technical spirit of the present disclosure. Accordingly, the embodiments disclosed in this specification are not intended to limit the technical idea of the present disclosure, but rather to explain it, and the scope of the technical idea of the present disclosure is not limited by these embodiments. Therefore, the embodiments described above should be understood in all respects as illustrative and not restrictive. The scope of protection of the present disclosure should be interpreted in accordance with the claims, and all technical ideas within the equivalent scope should be interpreted as being included in the scope of rights of the present disclosure.

The invention claimed is:

1. A vehicle assistance device comprising:
an information provider configured to provide information necessary to perform an assistance function; and
a controller configured to:
determine whether a driver is drinking based on information provided from the information provider;
determine a drinking caution level upon determining that the driver is drinking; and
perform drinking assistance control if the drinking caution level meets conditions for entering a drinking caution mode;
wherein the controller is configured to determine a drinking method, a beverage temperature, and a beverage remaining amount from a driver's face image provided from the information provider, and to determine the drinking caution level based on at least one of the drinking method, the beverage temperature, or the beverage remaining amount.

2. The vehicle assistance device of claim 1, wherein the information provider comprises:
a cup holder sensor disposed in a cup holder in a vehicle, the cup holder sensor being configured to measure a weight of the cup holder;
a driver capturing sensor configured to capture an image of the driver's face; and
a driving environment information provider configured to provide environmental information on a driving route of the vehicle.

3. The vehicle assistance device of claim 2, wherein the driver capturing sensor comprises:
a camera configured to acquire a general image of the driver's face; and
an infrared sensor configured to acquire a thermal image of the driver's face.

4. The vehicle assistance device of claim 2, wherein the driving environment information provider comprises:

a road environment information provider configured to provide road environment information on a driving route of the vehicle; and a front detection sensor configured to detect the front of the vehicle and provide front object information.

5. The vehicle assistance device of claim 2, wherein the controller is configured to determine whether the driver is drinking if the weight of the cup holder provided from the cup holder sensor is equal to or greater than a preset reference weight.

6. The vehicle assistance device of claim 1, wherein the controller is configured to recognize a driver's gaze in a driver's face image provided from a driver capturing sensor of the information provider, and to determine whether the driver is drinking based on the driver's gaze.

7. The vehicle assistance device of claim 1, wherein the controller is configured to determine whether a drinking caution situation has occurred based on driving environment information provided from the driving environment information provider of the information provider upon entering the drinking caution mode.

8. The vehicle assistance device of claim 7, wherein the controller is configured to provide guidance on caution against drinking, and to perform the drinking assistance control upon determining that the drinking caution situation has occurred.

9. A vehicle assistance method performed by a controller based on information provided from an information provider, the vehicle assistance method comprising:

determining whether a driver is drinking based on information provided from the information provider;

determining a drinking caution level upon determining that the driver is drinking;

determining whether the drinking caution level meets conditions for entering a drinking caution mode; and performing drinking assistance control when the drinking caution level meets the conditions for entering the drinking caution mode;

wherein determining the drinking caution level comprises:

determining a drinking method, a beverage temperature, and a beverage remaining amount from a driver's face image provided from the information provider; and determining the drinking caution level based on at least one of the drinking method, the beverage temperature, or the beverage remaining amount.

10. The vehicle assistance method of claim 9, wherein determining whether the driver is drinking is performed if a weight of a cup holder provided from the information provider is equal to or greater than a preset reference weight.

11. The vehicle assistance method of claim 9, wherein determining whether the driver is drinking comprises:

recognizing a driver's gaze in a driver's face image provided from the information provider; and determining whether the driver is drinking based on the driver's gaze.

12. The vehicle assistance method of claim 9, wherein, in the determining of the drinking caution level, the drinking method is determined based on whether a straw is used, the beverage temperature is determined based on a temperature around a driver's mouth, and the beverage remaining amount is determined based on a change in the driver's gaze.

13. The vehicle assistance method of claim 9, wherein determining whether the drinking caution level meets the conditions for entering the drinking caution mode comprises determining that the conditions for entering the drinking caution mode are met if the drinking caution level is equal to or greater than a preset reference level.

14. The vehicle assistance method of claim 9, further comprising:

determining whether a drinking caution situation has occurred based on driving environment information provided from the information provider if the drinking caution level meets the conditions for entering the drinking caution mode; and providing guidance on caution against drinking when the drinking caution situation has occurred.

15. The vehicle assistance method of claim 14, wherein determining whether the drinking caution situation has occurred comprises determining that the drinking caution situation has occurred when driving route environment information provided from the information provider includes a drinking caution place or facility.

16. The vehicle assistance method of claim 14, wherein determining whether the drinking caution situation has occurred comprises:

determining a possibility of collision with a front object based on front object information provided from the information provider; and determining that the drinking caution situation has occurred upon determining that there is a possibility of collision.

17. The vehicle assistance method of claim 9, further comprising determining whether drinking assistance function termination conditions are met while performing drinking assistance control, wherein determining whether the drinking assistance function termination conditions are met comprises determining whether the drinking assistance function termination conditions are met based on a driver's face image provided from the information provider and weight information of the cup holder.

18. A vehicle including a vehicle assistance device, wherein the vehicle assistance device comprises:

an information provider configured to provide information necessary to perform an assistance function; and a controller configured to:

determine whether a driver is drinking based on information provided from the information provider;

determine a drinking caution level upon determining that the driver is drinking; and perform drinking assistance control when the drinking caution level meets conditions for entering a drinking caution mode;

wherein the controller is configured to determine a drinking method, a beverage temperature, and a beverage remaining amount from a driver's face image provided from the information provider, and to determine the drinking caution level based on at least one of the drinking method, the beverage temperature, or the beverage remaining amount.

* * * * *